United States Patent
Uematsu et al.

(10) Patent No.: US 11,920,018 B2
(45) Date of Patent: Mar. 5, 2024

(54) SEMICONDUCTIVE POLYMER COMPOSITION FOR ELECTRIC POWER CABLES

(71) Applicant: BOREALIS AG, Vienna (AT)

(72) Inventors: Takashi Uematsu, Stenungsund (SE); Christer Svanberg, Kallered (SE); Karl-Michael Jäger, Gothenburg (SE); Fredrik Skogman, Stenungsund (SE); Koenraad Noyens, Geel (BE); Peter Walter, Savedalen (SE); Malin Johansson, Stenungsund (SE)

(73) Assignee: BOREALIS AG, Vienna (AT)

( * ) Notice: Subject to any disclaimer, the term of this patent is extended or adjusted under 35 U.S.C. 154(b) by 870 days.

(21) Appl. No.: 16/178,243

(22) Filed: Nov. 1, 2018

(65) Prior Publication Data
US 2019/0136009 A1 May 9, 2019

Related U.S. Application Data

(62) Division of application No. 15/106,227, filed as application No. PCT/EP2014/003420 on Dec. 18, 2014, now abandoned.

(30) Foreign Application Priority Data

Dec. 20, 2013 (EP) .................................. 13005982

(51) Int. Cl.
| | |
|---|---|
| C08K 3/04 | (2006.01) |
| B29B 9/10 | (2006.01) |
| B29B 9/12 | (2006.01) |
| B29K 23/00 | (2006.01) |
| B29K 105/16 | (2006.01) |
| H01B 7/02 | (2006.01) |
| B29K 507/04 | (2006.01) |

(52) U.S. Cl.
CPC .................. *C08K 3/04* (2013.01); *B29B 9/10* (2013.01); *B29B 9/12* (2013.01); *H01B 7/0216* (2013.01); *B29K 2023/0633* (2013.01); *B29K 2105/16* (2013.01); *B29K 2507/04* (2013.01); *B29K 2995/0005* (2013.01); *C08L 2203/202* (2013.01)

(58) Field of Classification Search
None
See application file for complete search history.

(56) References Cited

U.S. PATENT DOCUMENTS

| | | | |
|---|---|---|---|
| 3,401,020 A | 9/1968 | Kester et al. | |
| 3,922,335 A | 11/1975 | Jordan et al. | |
| 4,286,023 A | 8/1981 | Ongchin | |
| 4,340,577 A | 7/1982 | Sugawara et al. | |
| 4,391,789 A | 7/1983 | Estopinal | |
| 4,612,139 A | 9/1986 | Kawasaki et al. | |
| 5,556,697 A | 9/1996 | Flenniken | |
| 5,654,357 A * | 8/1997 | Menashi | ................... C09C 1/58 524/495 |
| 5,747,563 A | 5/1998 | Flenniken et al. | |
| 6,086,792 A | 7/2000 | Reid et al. | |
| 8,425,806 B2 | 4/2013 | Noyens et al. | |
| 9,728,295 B2 | 8/2017 | Uematsu et al. | |
| 2007/0203284 A1* | 8/2007 | Schuch | ..................... C09C 1/58 524/495 |
| 2010/0206607 A1* | 8/2010 | Noyens | ............... H01L 51/0045 174/102 SC |
| 2011/0186328 A1 | 8/2011 | Easter | |
| 2017/0011817 A1 | 1/2017 | Uematsu et al. | |

FOREIGN PATENT DOCUMENTS

| | | |
|---|---|---|
| EP | 0420271 B1 | 12/1994 |
| EP | 0517868 B1 | 11/1995 |
| EP | 0629222 B1 | 9/1999 |
| EP | 0736065 B1 | 2/2000 |
| EP | 1309631 B1 | 4/2005 |
| EP | 1309632 B1 | 4/2005 |
| EP | 1695996 B1 | 8/2006 |

(Continued)

OTHER PUBLICATIONS

Non-Final Office Action issued in related U.S. Appl. No. 15/106,227 dated Sep. 18, 2019, 11 pages.
Final Office Action issued in related U.S. Appl. No. 15/106,227 dated Mar. 7, 2019, 13 pages.
William M. Hess et al., "Microstructure, morphology and general physical properties" Carbon Black: Science and Technology, Second Edition, Jan. 1993, 159-159 pages.
Kathleen Sellers, "Nanoscale Materials: Definition and Properties" Nanotechnology and the Environment, Sep. 2010, 26-26 pages.
Author Unknown, "Conductex 7051 Ultra Insulation Shield" Columbian Chemicals Company, Mar. 2012, pp. 74.

(Continued)

*Primary Examiner* — Shawn Mckinnon
(74) *Attorney, Agent, or Firm* — DITTHAVONG, STEINER, & MLOTKOWSKI

(57) ABSTRACT

The invention provides a novel semiconductive polymer composition with improved smoothness and dispersibility of carbon black when compounding the polymer composition and feasible balance with other properties such as volume resistivity. The semiconductive polymer composition comprises (a) from 30 to 90 wt % of a polymer component, (b) from 10 to 70 wt % of carbon black and the carbon black (b) has a mass pellet strength (MPS) according to ASTM D1937-13 of from 50 to 250 N. The invention further relates to a process for preparing the semiconductive polymer composition comprising the steps of: i) introducing 30-90 wt % of a polymer component as defined above and 0-8 wt % additives in a mixer device and mixing the polymer component and additives at elevated temperature such that a polymer melt is obtained; ii) adding 10-70 wt % of a carbon black as defined above to the polymer melt and further mixing of the polymer melt.

13 Claims, No Drawings

(56) References Cited

FOREIGN PATENT DOCUMENTS

| EP | 1849824 A1 | 10/2007 |
|---|---|---|
| EP | 2365010 A1 | 9/2011 |
| JP | H-04198273 A | 7/1992 |
| WO | 9308222 A1 | 4/1993 |
| WO | 0062014 A1 | 10/2000 |
| WO | 2006131266 A1 | 12/2006 |
| WO | 2009053042 A1 | 4/2009 |

OTHER PUBLICATIONS

International Search Report & Written Opinion of the International Application No. issued in International Application No. PCT/EP2014/003420 dated Mar. 27, 2015.

Author Unknown, "Standard Test Method for Carbon Black, Pelleted—Mass Strength" ASTM International, Designation: D1937-13, 2018, pp. 1-3.

\* cited by examiner

SEMICONDUCTIVE POLYMER COMPOSITION FOR ELECTRIC POWER CABLES

This application is a Divisional of U.S. patent application Ser. No. 15/106,227, filed Jun. 17, 2016, which is a National Stage Entry of PCT/EP2014/003420, filed Dec. 18, 2014, which claims priority to European Patent Application No. 13005982.7, filed Dec. 20, 2013, the contents of which are hereby incorporated by reference.

The present invention relates to a semiconductive polymer composition, to a method for preparing said semiconductive polymer composition, to its use for the production of a semiconductive layer of an electric power cable, and to an electric power cable comprising at least one semiconductive layer, which layer comprises the above mentioned semiconductive polymer composition.

In wire and cable applications a typical cable comprises at least one conductor surrounded by one or more layers of polymeric materials. In power cables, including medium voltage (MV), high voltage (HV) and extra high voltage (EHV), said conductor is surrounded by several layers including an inner semiconductive layer, an insulation layer and an outer semiconductive layer, in that order. The cables are commonly produced by extruding the layers on a conductor. Such polymeric semiconductive layers are well known and widely used in dielectric power cables rated for voltages greater than 1 kilo Volt. These layers are used to provide layers of intermediate resistivity between the conductor and the insulation, and between the insulation and the ground or neutral potential.

These compositions are usually prepared in granular or pellet form. Polyolefin formulations such as these are disclosed in U.S. Pat. Nos. 4,286,023; 4,612,139; and 5,556,697; and European Patent 420 271. One or more of said layers of the power cable are typically crosslinked to achieve desired properties to the end product cable. Crosslinking of polymers, i.e. forming primarily interpolymer crosslinks (bridges), is one well known modification method in many end applications of polymers. Crosslinking of polymers, such as polyolefins, substantially contributes i.a. to heat and deformation resistance, creep properties, mechanical strength, as well as to chemical and abrasion resistance of a polymer. In wire and cable applications crosslinked polymers, such as crosslinked polyethylenes, are commonly used as a layer material, e.g. in insulating, semi-conducting and/or jacketing layers.

The purpose of a semiconductive layer is to prolong the service life, i.e. long term viability, of a power cable i.a. by preventing partial discharge at the interface of conductive and dielectric layers. Surface smoothness of the extruded semiconductive layer is a property that plays an important role in prolonging the surface life of the cable. The smoothness is influenced i.a. by the type of the used carbon black. An uneven distribution of the particle size of carbon black particles can adversely affect said surface smoothness and cause localised electrical stress concentration which is a defect that can initiate a phenomenon well known as vented trees. Moreover, the surface properties and particle size as such of the carbon black may affect the surface smoothness of the semiconductive layer of a power cable. For example, it is known that the larger the carbon black particles are, the smoother the surface of the semiconductive layer is.

However, increasing the particle size of a carbon black for improving smoothness in turn deteriorates, i.e. increases, the resistivity of the semiconductive layer material, whereby these properties need often be balanced. Especially in case of so called furnace carbon black the contradicting properties of surface smoothness and volume resistivity are pronounced.

Furnace carbon black is a generally acknowledged term for the well known carbon black type that is produced in a furnace-type reactor by pyrolyzing a hydrocarbon feedstock with hot combustion gases. A variety of preparation methods thereof are known and such furnace carbon blacks are described i.a. in EP 0 629 222, U.S. Pat. Nos. 4,391,789, 3,922,335, 3,401,020 and 6,086,792. Furnace carbon black is distinguished herein from acetylene carbon black which is also a generally acknowledged term for the well known type of carbon black produced by reaction of acetylene and unsaturated hydrocarbons, e.g. as described in U.S. Pat. No. 4,340,577.

Commercial furnace carbon black grades are e.g. described in ASTM D 1765-13 such as N351, N293 and N550. Carbon black N550 is described e.g. in US 2011/0186328 A1. The letter "N" indicates a normal curing rate of a typical rubber compound containing the carbon black. It is typical for furnace carbon black that has not received a special modification in order to alter its influence on the rate of cure of rubber. However, furnace carbon black is usually less suited for semiconductive compositions used in wire and cable applications due to its rather high volume resistivity and poor dispersion properties in polymers.

WO 2009/053042 A1 relates to a semiconductive polymer composition for the production of a semiconductive layer of an electric power cable, which exhibits improved surface smoothness and has good balance with other properties needed for a semiconductive polymer material. The semiconductive polymer composition comprises a polyolefin component, carbon black and additives. The carbon black used for preparing the semiconductive composition was a commercially available furnace carbon black.

Moreover, many carbon blacks, e.g. the above mentioned furnace carbon blacks, are commercially available in a form of "pellet" agglomerates formed from primary carbon black particles thereof. These agglomerates are broken during the processing, i.e. during compounding in the preparation of said semiconductive polymer composition. The breakdown of said agglomerates thus may also have an effect on said surface smoothness property. Without binding to any theory it appears that an extensive mixing of semiconductive polymer mixture in order to get an even particle size distribution amongst the carbon black particles may adversely affect the resistivity of the composition. Accordingly there seem to be limitations in the particle size window for the carbon black particles to enable sufficient smoothness and resistivity of the final product.

Thus, it is the object underlying the present invention to provide a novel semiconductive polymer composition with improved smoothness and dispersibility of carbon black when compounding the polymer composition and at the same time feasible balance with other properties such as volume resistivity.

The inventors found that this object is achieved by a semiconductive polymer composition comprising:
(a) from 30 to 90 wt % of a polymer component,
(b) from 10 to 70 wt % of carbon black and
wherein the carbon black (b) has a mass pellet strength (MPS) according to ASTM D1937-13 of from 50 to 250 N, preferably from 50 to 200 N, even more preferably from 50 to 180 N.

Especially the invention is based on the finding that the modification of the pellet crush resistance of a conventional carbon black (medium to high pellet crush resistance) gives an excellent surface smoothness for a semiconductive polymer composition even if the carbon black content of the composition is rather high, e.g. 20 wt % or more, 30 wt % or more, or even 40 wt % or more, based on the total weight semiconductive polymer composition. Still the volume resistivity is excellent. For the purposes of the present invention, a volume resistivity of 500 ohm·m is beneficial. Thus, a compromise between the contradicting properties of surface smoothness and volume resistivity of a semiconductive polymer composition not reached before, could be achieved.

Preferably, in the semiconductive polymer composition of the invention the carbon black (b) has an average value of individual pellet hardness (CSAV) according to ASTM D5230-13 of from 5 to 30 cN, more preferably from 10 to 30 cN.

The carbon black (b) may further have an average value of individual pellet hardness for the 5 hardest pellets (M5H) according to ASTM D5230-13 of from 10 to 40 cN, preferably from 15 to 35 cN.

The properties of mass pellet strength according to ASTM D1937-13 and individual pellet hardness according to ASTM D5230-13 reflect the toughness of the carbon black pellets and the above-defined ranges surprisingly give an excellent dispersion of the carbon black during compounding and extrusion. Individual pellet hardness encompasses the parameters of CSAV and M5H as defined under "Determination Methods". If the parameters of mass pellet strength and individual pellet hardness are above the defined ranges, the crushing of the pellets is difficult, resulting in poorer carbon black dispersion or a roughened surface of the composition and tape layer. If the above parameters are below the defined ranges, the pellets result in an increased level of fines and processability of the semiconductive polymer composition will decrease.

The carbon black (b) may preferably have an average pellet size according to ASTM D1511-12 of from 0.1 to 5 mm, more preferably from 0.5 to 3 mm, even more preferably from 0.6 to 2 mm. Any of the above lower limits may be combined with any of the above upper limits to form another preferred range for the average pellet size of the carbon black.

According to further preferred embodiments the carbon black (b) may have one or more of the following characteristics:

a BET surface area (STSA value), measured by nitrogen adsorption according to ASTM D 6556-10 of from 20 to 60 $m^2/g$, preferably from 30 to 50 $m^2/g$, more preferably from 35 to 45 $m^2/g$;

an iodine adsorption number measured according to ASTM D1510-13, method A of from 20 to 60 g/kg, preferably from 30 to 55 g/kg, more preferably from 38 to 48 g/kg;

a DBP oil absorption number measured according to ASTM D2414-13 of from 100 to 150 $cm^3/100$ g, preferably from 110 to 140 $cm^3/100$ g, more preferably from 116 to 126 $cm^3/100$ g.

The semiconductive polymer composition preferably has a surface smoothness measured in accordance with the Surface Smoothness Analysis (SSA) method as defined under "Determination Methods" using a tape sample as described below of not more than 200 particles/$m^2$, preferably not more than 100 particles/$m^2$, even more preferably not more than 50 particles/$m^2$ having a width of larger than 150 μm, and not more than 9 particles/$m^2$, preferably not more than 8 particles/$m^2$, even more preferably not more than 6 particles/$m^2$ having a width of larger than 200 μm.

As the polymer component (a), any commercial polymer or a polymer obtainable by a commercial polymerization process can be used in the polymer composition of the invention. The amount of said polymer component (a) of said semiconductive polymer composition of the invention is preferably of from 40 to 75 wt %, more preferably of from 50 to 70 wt %. Said polymer component (a) of said semiconductive polymer composition is preferably a polyolefin, more preferably a polymer of an alpha-olefin which may include a homopolymer of ethylene or copolymer of ethylene with one or more comonomers, which is selected from a branched polyethylene homo- or copolymer produced at high pressure by free radical initiated polymerisation (referred to as high pressure radical polymerization) and well known as low density polyethylene (LDPE) homopolymer, or copolymer, which is referred herein as LDPE homo- or copolymer, or a linear polyethylene homo- or copolymer produced by low pressure polymerisation using a coordination catalyst, such as well known linear very low density polyethylene (VLDPE), linear low density polyethylene (LLDPE), medium density polyethylene (MDPE) or high density polyethylene (HDPE), which is referred herein as "linear PE homo- or copolymer", or a mixture of such polymers.

The polyethylene as defined above suitable as said polymer component (a) can be said linear PE homo- or copolymer, which is preferably VLDPE, LLDPE, MDPE or HDPE polymer. They can be produced in a known manner in a single or multistage processes e.g. as slurry polymerisation, a solution polymerisation, a gas phase polymerisation, and in case of multistage process in any combination(s) thereof, in any order, using one or more of e.g. Ziegler-Natta catalysts, single site catalysts, including metallocenes and non-metallocenes, and Cr-catalysts. The preparation of linear ethylene polymer is and the used catalysts are very well known in the field, and as an example only, reference is made i.a. to a multistage process described in EP517868.

The preferred polymer component (a) of the invention is said polyethylene as defined above and is more preferably said LDPE homo or copolymer which may optionally have an unsaturation that can preferably be provided by copolymerising ethylene with at least one polyunsaturated comonomer as defined above and/or by using a chain transfer agent, such as propylene. Such polymers are well known and described e.g. in WO 93/08222, EP 1695996 or WO2006/131266. Typically said unsaturated polyolefins have a double bond content of more than 0.1 double bonds/1000 C-atoms.

Further, the LDPE homo or copolymer subgroup of said preferred ethylene polymers is more preferably an LDPE copolymer of ethylene with one or more comonomers which are preferably selected from:

$C_3$ or higher olefin comonomer(s), preferably ($C_3$-$C_{30}$) alpha-olefin comonomer(s), more preferably ($C_3$-$C_{12}$)alpha-olefin comonomer(s); polar comonomer(s), silane comonomer(s) or polyunsaturated comonomer(s), e.g. a comonomer with at least two double bonds, such as diene comonomers; or a mixture of the above mentioned comonomers, and which LDPE copolymer may optionally have a further unsaturation provided by using a chain transfer agent, such as propylene, and which LDPE copolymer is referred herein as LDPE copolymer. The comonomers mentioned above, as well as chain transfer agents are well known in the art. The polar groups of said polar comonomer are preferably selected from siloxane, amide, anhydride, carboxylic, carbonyl, hydroxyl, ester and epoxy groups.

Most preferred polymer component (a) of said semiconductive polymer composition is said LDPE copolymer, more preferably is a LDPE copolymer, wherein the comonomer is selected from one or more of polar comonomer(s) and may optionally comprise an unsaturation provided preferably by copolymerising ethylene with at least one polyunsaturated comonomer(s) and/or by using a chain transfer agent, such as propylene, as defined above, which LDPE copolymer is referred herein as LDPE copolymer of ethylene with at least polar comonomer(s), and is most preferably an LDPE copolymer of ethylene and at least polar comonomer(s). More preferably, said polar comonomer(s) in said LDPE copolymer of ethylene with at least polar comonomer(s) for said semiconductive polymer composition is/are selected from: vinyl carboxylate esters, such as vinyl acetate and vinyl pivalate, (meth)acrylates, such as methyl(meth)acrylate, ethyl(meth)acrylate, butyl(meth)acrylate and hydroxyethyl (meth)acrylate, olefinically unsaturated carboxylic acids, such as (meth)acrylic acid, maleic acid and fumaric acid, (meth)acrylic acid derivatives, such as (meth)acrylonitrile and (meth)acrylic amide, vinyl ethers, such as vinyl methyl ether and vinyl phenyl ether.

More preferably, said LDPE copolymer of ethylene with at least polar comonomer(s) is a LDPE copolymer of ethylene with one or more of vinyl esters of monocarboxylic acids having 1 to 4 carbon atoms, such as vinyl acetate, or of (meth)acrylates of alcohols having 1 to 4 carbon atoms, or of a mixture thereof, preferably of vinyl acetate, methyl (meth)acrylate, ethyl (meth)acrylate or butyl (meth)acrylate. The preferred subgroup of said LDPE copolymer of ethylene with at least polar comonomer(s) is a LDPE copolymer of ethylene with at least vinyl acetate, LDPE copolymer of ethylene with at least methyl acrylate, a LDPE copolymer of ethylene with at least ethyl acrylate or a LDPE copolymer of ethylene with at least butyl acrylate, or any mixture thereof. The term "(meth)acrylic acid" and "(meth)acrylate" are intended to embrace both acrylic acid and methacrylic acid and, respectively "methacrylate" and "acrylate".

The content of polar comonomer in said LDPE copolymer of ethylene with at least polar comonomer(s) as defined above, that is most preferable as said polymer component (a) is not limited and may be of up to 70 wt %, preferably of 0.5 to 35 wt %, more preferably of 1.0 to 35 wt %, of the total amount of said LDPE copolymer.

High pressure polymerisation for producing said LDPE homo or copolymer and the subgroups as defined above, is a well known technology in the polymer field and can be effected in a tubular or an autoclave reactor, preferably, in a tubular reactor. The high pressure polymerisation is carried out suitably in a known manner, e.g. at temperature range from 80 to 350° C. and pressure of from 100 to 400 MPa typically in the presence of an initiator of the free radical/ polymerisation reaction. Further details about high pressure radical polymerisation are given in WO 93/08222. The polymerisation of the high pressure process is generally performed at pressures of from 1200 to 3500 bar and temperatures of from 150 to 350° C.

The melt flow rate $MFR_2$, of said polymer component (a) may typically be at least 0.01 g/10 min, suitably at least 0.5 g/10 min, preferably at least 1.0 g/10 min, more preferably at least 2.0 g/10 min, even more preferably at least 3.0 g/10 min, when measured according to ISO 1133, 2.16 kg load, 190° C. The upper limit $MFR_2$ of said polymer component (a) is not limited and may be e.g. up 50 g/10 min, such as up to 30 g/10 min, preferably up to 20 g/10 min, more preferably up to 15 g/10 min, when determined as defined above.

The melt flow rate $MFR_{21}$ of said polymer composition (including carbon black (b)) may preferably be at least 0.1 g/10 min, more preferably at least 0.5 g/10 min, especially preferably at least 1.0 g/10 min, even more preferably at least 2.0 g/10 min when measured according to ISO 1133, 21.6 kg load, at 125° C. The upper limit $MFR_{21}$ of said polymer composition may preferably be up to 20 g/10 min, more preferably up to 15 g/10 min, even more preferably up to 10 g/10 min when measured according to ISO 1133, 21.6 kg load, at 125° C.

Any of the above lower limits may be combined with any of the above upper limits to form another preferred range for $MFR_2$ or $MFR_{21}$, respectively.

It is preferred that said semiconductive polymer of the invention is in the form of polymer powder or, preferably, of pellets. The term pellets include herein granules and pellets of any shape and type and are very well known and can be produced in known manner using the conventional pelletising equipment.

In a further preferred embodiment the semiconductive polymer composition is cross-linkable via radical reaction or crosslinking via silane groups. In case of said semiconductive polymer composition is crosslinkable via silane groups said silane groups can be introduced into the polymer structure by copolymerisation of monomers, such as olefin monomers, with silane-moiety bearing comonomers, or by grafting crosslinkable silane-moieties bearing compounds, such as unsaturated silane compounds with hydrolysable silane group(s), onto a polymer. Both methods are well known in the art. Grafting is usually performed by radical reaction using free radical generating agents. Both for copolymerisation and for grafting methods an unsaturated silane compound which is represented by the formula

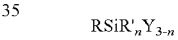

$$RSiR'_nY_{3-n}$$

wherein R is an ethylenically unsaturated hydrocarbyl or hydrocarbyloxy group, R' is an aliphatic, saturated hydrocarbyl group, Y is a hydrolysable organic group, and n is 0, 1 or 2. If there is more than one Y group, these groups do not have to be identical. Special examples of the unsaturated silane compound are those wherein R is vinyl, allyl, isopropenyl, butenyl, cyclohexenyl or gamma-(meth)acryloxypropyl, Y is methoxy, ethoxy, formyloxy, acetoxy, propionyloxy or an alkyl or arylamino group, and R1 is a methyl, ethyl, propyl, decyl or phenyl group.

An especially preferred unsaturated silane compound is represented by the formula $CH_2=CHSi(OA)_3$, wherein A is a hydrocarbyl group having 1-8 carbon atoms, preferably 1-4 carbon atoms. The most preferred compounds are vinyltrimethoxy silane, vinyl dimethoxyethoxy silane, vinyltriethoxy silane, gamma-(meth)acryloxypropyl silane, and vinyltriacetoxy silane.

Preferred crosslinkable semiconductive polymer composition of the invention is crosslinkable via radical reaction, whereby said the semiconductive polymer composition comprises a cross-linking agent, preferably peroxide which preferably constitutes between 0-8 wt %, preferably of from 0.1 to 5 wt %, of the semiconductive polymer composition. Preferred peroxides used for cross-linking are di-tert-amylperoxide, 2,5-di(tert-butylperoxy)-2,5-dimethyl-3-hexyne, 2,5-di(tert-butylperoxy)-2,5-dimethylhexane, tert-butylcumylperoxide, di(tert-butyl)peroxide, dicumylperoxide, di(tert-butylperoxy-isopropyl)benzene, butyl-4,4-bis(tert-butylperoxy)valerate, 1,1-bis(tert-butylperoxy)-3,3,5-trimethylcyclohexane, tert-butylperoxybenzoate, dibenzoylperoxide. Further, the addition of the crosslinking agent is preferably effected after an optional subsequent process step of pellet formation, as described further below.

Said semiconductive polymer composition may comprise further components, typically additives, such as antioxidants, crosslinking boosters, scorch retardants, processing aids, fillers, coupling agents, ultraviolet absorbers, stabilizers, antistatic agents, nucleating agents, slip agents, plasticizers, lubricants, viscosity control agents, tackifiers, antiblocking agents, surfactants, extender oils, acid scavengers and/or metal deactivators. The content of said additives may preferably range from 0 to 8 wt %, based on the total weight of the semiconductive polymer composition.

Examples of such antioxidants are as follows, but are not limited to: hindered phenols such as tetrakis[methylene(3, 5-di-tert-butyl-4-hydroxyhydrocinnamate)]methane, bis-peta-(3,5-ditert-butyl-4-hydroxybenzyl)-methylcarboxyethylAsulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearyl-thiodipropionate; various siloxanes; polymerized 2,2,4-trimethyl-1,2-dihydroquinoline, n,n'-bis(1,4-dimethylpentyl-p-phenylenediamine), alkylated diphenylamines, 4,4'-bis(alpha,alpha-dimethylbenzyl)diphenylamine, diphenyl-p-phenylenediamine, mixed di-aryl-p-phenylenediamines, and other hindered amine antidegradants or stabilizers. Antioxidants can be used in amounts of about 0.1 to about 5 percent by weight based on the weight of the composition.

Examples of further fillers as additives are as follows: clays, precipitated silica and silicates, fumed silica, calcium carbonate, ground minerals, and further carbon blacks. Fillers can be used in amounts ranging from less than about 0.01 to more than about 50 percent by weight based on the weight of the composition.

A second aspect of the present invention relates to a process for preparing a semiconductive polymer composition comprising the steps of: i) introducing 30-90 wt % of a polymer component (a) as defined above and 0-8 wt % additives in a mixer device and mixing the polymer component (a) and additives at elevated temperature such that a polymer melt is obtained; ii) adding 10-70 wt % of a carbon black as defined above to the polymer melt and further mixing of the polymer melt to obtain a semiconductive polymer mixture, and iii) extruding and pelletising the obtained polymer mixture to obtain said semiconductive polymer composition.

Preferably, the carbon black is added to the polymer melt in at least two subsequent addition steps. It is even more preferred when in the first addition step at least ⅔ of the total amount of carbon black is added to the melt, and in the second addition step the remainder of the total amount of carbon black is added to the melt. By carrying out the method according to the invention in this way, a very advantageous particle size distribution and mixing of the carbon black in the polymer mixture is obtained.

It is preferred when the semiconductive composition, depending on the desired end application, comprises not more than 200, more preferably not more than 100, even more preferably not more than 50, especially preferably not more than 25, and in very demanding end applications even not more than 15, particles per $m^2$ having a width larger than 150 μm at the half height of said particle protruding from the surface of the tape sample.

Preferably, the semiconductive composition comprises not more than 9, more preferably not more than 8, most preferably not more than 6 particles per $m^2$ having a width larger than 200 μm at the half height of said particle protruding from the surface of the tape sample.

In a most preferred embodiment the semiconductive composition comprises not more than 10 particles per $m^2$ having a width larger than 150 μm at the half height of said particle protruding from the surface of the tape sample and not more than 3 particles per $m^2$ having a width larger than 200 μm at the half height of said particle protruding from the surface of the tape sample.

The carbon black is preferably furnace carbon black and/or the polymer component is preferably a homo- or copolymer of polyethylene. Any type of furnace carbon black may be used, but in a preferred embodiment of the invention a modified carbon black based on N550 type is employed.

In this regard it is further noted that in the method according to the invention the carbon black, the polymer component and the additives may be, and most preferably are, as have been described above in relation to the polymer composition. The mixing after introducing the polymer component (a) and optional additives in the preparation process is effected at elevated temperature and results typically in melt mixing, typically more than 10° C. above, preferably more than 25° C., above the melting point of the polymer component(s) and below the undesired degradation temperature of the components, preferably below 250° C., more preferably below 220° C., more preferably of from 155 to 210° C., depending on the used polymer material. Preferably said preparation process of the invention further comprises a step of pelletising the obtained polymer mixture. Pelletising can be effected in well known manner using a conventional pelletising equipment, such as preferably conventional pelletising extruder which is integrated to said mixer device. The process of the invention can be operated in batch wise or in continuous manner.

Apparatuses used for carrying out the method of the invention are for example single screw or twin screw mixer or a kneading extruder, or a combination thereof, which is preferably integrated in a pelletising device. The apparatus(es) may be operated in batch wise or, preferably, in continuous manner. The process may comprise a further subsequent sieving step before preferable pelletising step which is also conventionally used in the prior art in the preparation of semiconductive polymer compositions to limit the number of large particles. Said sieving step has normally no or minor effect on particle size distribution as now provided by the present invention. A third aspect of the present invention relates to a semiconductive polymer composition or pellets thereof which can be obtained by the method as described above.

A fourth aspect of the invention relates to the use of the semiconductive polymer or its pellets for the production of a semiconductive layer of an electric power cable. A further aspect of the present invention relates to an electric power cable comprising at least one semiconductive layer, which layer comprises a semiconductive polymer composition as described above.

Preferably, the power cable may comprise a conductor, an inner semiconductive layer (a), an insulation layer (b) and an outer semiconductive layer (c), each coated on the conductor in this order, wherein at least one of the inner and outer semiconductive layer(s) (a;c) comprises a semiconductive polyolefin composition according to the present invention as described above.

In a further preferred embodiment of the inventive power cable both the inner (a) and outer (c) semiconductive layers, comprise, more preferably consist of the semiconductive polyolefin composition according to the present invention.

In a further preferable embodiment, at least one of the inner and outer semiconductive layers (a;c) is crosslinkable, preferably both inner (a) and outer (c) semiconductive layers are crosslinkable.

According to another embodiment of the inventive power cable the outer semiconductive layer (c) may be strippable or non-strippable, preferably non-strippable, i.e. bonded. These terms are known and describe the peeling property of the layer, which may be desired or not depending on the end application. In case of strippable semiconductive layer, the polymer (a) of the invention is more polar having a content of polar comonomers of at least 20.0 wt %, such as at least 25.0 wt %, preferably at least 26.0 wt % more preferably from 27.0 to 35.0 wt %, based on said polymer (a), and may contain further polar polymer components to contribute to strippability. Preferably the outer semiconductive, if present, is non-strippable and has a content of polar comonomers of less than 25.0 wt %, preferably less than 20.0 wt %, more preferable of from 10.0 to 18.0 wt %. In some embodiments the polar comonomer content as low as of 6.0 to 15.0 wt % based on said polymer (a) may be desired. In both strippable and non-strippable cases the layer is preferably crosslinkable.

The insulation layer (b) is well known in power cable applications and can comprise any polymeric material suitable and/or conventionally used for such insulation layer. Also the insulation layer (b) is preferably crosslinkable. Accordingly, the invention also provides a process for producing a power cable, wherein the process comprises blending the semiconductive polyolefin composition of the invention as defined above including any subgroups thereof, optionally with other polymer components and optionally with additives, above the melting point of at least the major polymer component(s) of the obtained mixture, and extruding the obtained melt mixture on a conductor for forming at least one semiconductive polymer layer on a conductor for a power cable. The processing temperatures and devices are well known in the art. Preferably, said polyolefin composition of the invention is used in form of pellets which are added to the mixing step and melt mixed. Preferably, the semiconductive polyolefin composition is co-extruded on the conductor together with one or more further cable layer(s) forming polymeric composition(s), thus providing a multilayered power cable, preferably a multilayered power cable as defined above. After providing the layered power cable structure, preferably the multilayered power cable as defined above, the obtained cable is then crosslinked in a subsequent crosslinking step, i.e. said cable preparation process comprises a further step of crosslinking the obtained power cable as defined above, by contacting said at least one semiconductive layer which comprises said semiconductive polymer composition as defined above and which layer is crosslinkable, with a crosslinking agent, which is preferably a silanol condensation catalyst, in the presence of water in case of crosslinking via silane groups, or with a crosslinking agent which is preferably a peroxide in case of crosslinking via radical reaction.

Preferably, said at least one semiconductive cable layer is crosslinked during the preparation process of said cable via radical reaction using a peroxide as the crosslinking agent.

Such crosslinking step is preferably effected as an integrated subsequent step of the cable preparation process in a crosslinking zone. Preferred peroxide-crosslinking can be effected at the temperature of at least above 160° C., preferably above 170° C. The crosslinked cable is then recovered and further processed if needed.

In the alternative crosslinking via silane groups, said layers comprising said semiconductive polymer composition of the invention are preferably crosslinked using a silanol-condensation catalyst which is preferably selected from carboxylates of metals, such as tin, zinc, iron, lead and cobalt; from organic bases; from inorganic acids; and from organic acids; more preferably from carboxylates of metals, such as tin, zinc, iron, lead and cobalt, or from organic acids, preferably from an organic sulphonic acid having a formula $Ar(SO_3H)_x$ (II) wherein Ar is an aryl group which may be substituted or non-substituted, and x being at least 1, or a precursor of the sulphonic acid of formula (II) including an acid anhydride thereof or a sulphonic acid of formula (II) that has been provided with a hydrolysable protective group(s), e.g. an acetyl group that is removable by hydrolysis. Such organic sulphonic acids are described e.g. in EP736065, or alternatively, in EP 1 309 631 and EP 1 309 632.

The crosslinking via silane groups is effected in an elevated temperature, typically of below 100° C., preferably of below 80° C., more preferably of between 60 to 80° C. If said preferable silanol condensation catalyst as defined above is used, the crosslinking step is carried out in the presence of water or steam, e.g. water vapor, or both, preferably at least water vapor, as well known in the art. Said silane-crosslinking can be effected in a conventional manner using a conventional equipment.

Preferred crosslinking of cable is crosslinking via radical reaction using a peroxide as defined above.

Thus said crosslinked cables obtainable by the above crosslinking method via silane groups or, preferably via radical reaction, are also provided.

Determination Methods

If not already specified in the above general description the properties as defined above, in below examples and claims where analysed using the following methods.

Wt %=weight percent a) Melt Flow Rate $MFR_2$ is the melt flow rate of a polymer component (a) and was measured according to ISO 1133, 2.16 kg load, at 190° C. for polyethylene. $MFR_{21}$ of a polymer composition (including carbon black) was measured according to ISO 1133, 21.6 kg load, at 125° C. for polyethylene.

b) Comonomer Content

Comonomer content was based on the polymerisable comonomer units and was determined by using $^{13}$C-NMR. The $^{13}$C-NMR spectra were recorded on Bruker 400 MHz spectrometer at 130° C. from samples dissolved in 1,2,4-trichlorobenzene/benzene-d6 (90/10 w/w).

In an alternative and comparable method for comonomer content (wt %): was determined in a known manner based on Fourier transform infrared spectroscopy (FTIR) determination calibrated with $^{13}$C-NMR. The peak for the comonomer was compared to the peak of polyethylene (e.g. the peak for butyl acrylate at 3450 $cm^{-1}$ was compared to the peak of polyethylene at 2020 $cm^{-1}$ and the peak for silane at 945 was compared to the peak of polyethylene at 2665 $cm^{-1}$. The calibration with $^{13}$C-NMR is effected in a conventional manner which is well documented in the literature. The weight-% was converted to mol-% by calculation.

c) Mass Pellet Strength

The test is performed determined according to ASTM D1937-13. This test method covers the determination of the mass strength of pelleted carbon black. It is designed to determine the force required to pack a cylindrical column with pelleted carbon black. A sample of carbon black is placed in a vertical cylinder and pressed with a plunger for 10 s after which the bottom of the cylinder is opened, whereupon all of the carbon black either falls out the bottom or forms a ring or bridge in the cylinder. The process is repeated with a new sample until the minimum force required for the carbon black to form a ring or bridge is found. Force is increased with increments of 50 N. Once a bridge of pressed carbon black is formed, the end point has been reached or exceeded. An additional test is performed at a lower pressure to confirm that the end point has not been exceeded. The end point is the lowest number of newtons required to produce a ring or bridge of pressed carbon black in the cylinder. The resultant force is called mass strength and is reported in Newtons. The apparatus has the following specifications:

Mass strength tester: flat compression cylinder of 50.8 mm diameter.

Calibrating block: made from a cylindrical wooden shaft, 47 mm in diameter and 250 mm long.

Platform scale: 50 kg capacity with a sensitivity of 0.1 kg for air pressure gage calibration.

Overflow cup to fit around cylinder: normally part of the apparatus delivery.

Spatula: with a straight edge of at least 55 mm.

Carbon black samples are taken in accordance with practices ASTM D1799 or ASTM D1900.

d) Individual Pellet Hardness

Samples of carbon black are taken in accordance with practice ASTM D1799 or Practice ASTM D1900. The parameters of average crush strength (CSAV) and average value for the 5 hardest pellets (M5H) are determined according to ASTM D5230-13. A sample of carbon black is passed through two sieves to isolate a fraction of uniform size. An appropriate amount of pellets from this portion is selected and placed into the tester. The individual pellets are pressed against a platen with a load cell for measuring force. As pressure is applied the pellet will either break with a rapid force reduction or the pellet will simply compress. The individual pellet hardness is the maximum force prior to a force reduction of at least 3 cN or the maximum force required to compress the pellet to 90%, whichever comes first. For determination of CSAV, 20 pellets were tested and the average value was calculated. For determination of M5H the average value of the crush strength of the five hardest of the pellets taken from the determination of CSAV was calculated.

e) Total and External Surface Area of Carbon Black by Nitrogen Adsorption

The test method is performed according to ASTM D6556-10 and covers the determination of the total surface area by the Brunauer, Emmett, and Teller (B.E.T. NSA) theory of multilayer gas adsorption behavior using multipoint determinations and the external surface area based on the statistical thickness surface area method. The total and external surface areas are measured by evaluating the amount of nitrogen adsorbed, at liquid nitrogen temperature, by a carbon black at several partial pressures of nitrogen. A minimum of five data points evenly spaced in the 0.1 to 0.5 relative pressure (P/Po) range is obtained. A data point consists of the relative pressure of equilibrium and the total amount of nitrogen gas adsorbed by the sample at that relative pressure. The adsorption data is used to calculate the NSA and STSA values as described in ASTM D6556-10. Carbon black samples are taken in accordance with practices ASTM D1799 and ASTM D1900.

f) Iodine Adsorption Number of Carbon Black

The test method is performed according to ASTM D1510-13, method A. A weighed sample of carbon black is treated with a portion of standard iodine solution and the mixture shaken and centrifuged. The excess iodine is then titrated with standard sodium thiosulfate solution, and the adsorbed iodine is expressed as a fraction of the total mass of black (g/kg). Samples of carbon black are taken in accordance with practice ASTM D1799 or Practice ASTM D1900.

g) Oil Absorption Number (OAN) of Carbon Black

The test method is performed according to ASTM D2414-13, procedure A. Carbon black samples are taken in accordance with practices ASTM D1799 and ASTM D1900. n-Dibutyl phthalate (DBP) oil is added by means of a constant-rate buret (delivering 4+/−0.024 $cm^3$/min.) to a sample of carbon black in the mixer chamber of an absorptometer. The absorptometer is preferably equipped with a torque measuring system that includes a micro-computer and software to continuously record torque and oil volume with time. A testing temperature of 23+/−5° C. is maintained. As the sample absorbs the oil, the mixture changes from a free-flowing state to a semiplastic agglomeration, with an accompanying increase in viscosity. This increased viscosity is transmitted to the torque sensing system of the absorptometer. When the viscosity of the mixture reaches a predetermined torque level, the absorptometer and buret will shut off simultaneously. The volume of oil added is read from the direct-reading buret. The volume of oil per unit mass of carbon black is the oil absorption number ($cm^3$/100 g).

h) Pellet Size Distribution of Carbon Black

A sample of carbon black is shaken in a sieve shaker to separate the pellets by size with specified series of sieve screens arranged with progressively smaller openings. The percentage, by mass, of carbon black retained on each sieve is weighed to calculate the pellet size distribution. U.S. standard sieves (conforming to Specification E11), sieve nos. 10, 18, 35, 60, and 120 having openings respectively of 2000, 1000, 500, 250, and 125 μm, shall be used. The sieves shall be 25 mm in height and 200 mm in diameter. Carbon black samples are taken in accordance with practices ASTM D1799 and ASTM D1900.

j) Surface Smoothness Analysis (SSA) Method

The general definitions for the surface smoothness properties of the semiconductive polymer composition of the invention as given above and below in the claims, as well as given in the examples below were determined using the sample and determination method as described below.

For illustrative purposes a schematic overview of the test apparatus is provided in FIG. 1. Herein, a tape 1 consisting of the semiconductive polymer composition passes over a rod 2 at a given speed and a light beam 3 coming from the light source 4 passes over the tape 1 and this light beam 3 is captured by the camera 5. When there is a particle 7 protruding from the surface of the tape 1, the light beam 3 will be altered, which alteration will be recorded by the camera 5. From this recording by the camera 5 it is possible to calculate the height and the width of the particle protruding from the surface of the tape. In this manner the amount, height and width of the particles present in the tape can be measured.

This method is used to determine the surface smoothness, i.e. the particles protruding outwards from the surface and thus causing the roughness of the tape surface. It indicates the smoothness of a polymer layer on a cable produced by (co)extrusion. The method detects and measures the width of a protruding particle at the half height of said protrusion thereof from the surface of the tape. The test system is further generally described e.g. in WO 00/62014.

Tape Sample Preparation

About 4 kg of pellets of a semiconductive polymeric composition were taken and extruded into a form of tape sample using Collin single screw of 20 mm and 25D extruder (supplier Collin) and following temperature settings at different sections, starting from the inlet of the extruder: 95° C., 120° C., 120° C. and 125° C. to obtain a temperature of 125° C. of the polymer melt. The pressure before the extrusion plate is typically 260 bar, residence time is kept between 1 and 3 minutes and typical screw speed is 50 rpm, depending on the polymer material as known for a skilled person. Extruder die opening: 50 mm×1 mm, Thickness of the tape: 0.5 mm+/−10 µm, Width of the tape: 20 mm+/−2 mm.

The tape is cooled with air to solidify it completely before subjecting to a camera-scanning (detection) zone of the SSA-instrument which locates at a distance of 50 cm from the outlet of die. The measurement area: Camera of SSA-instrument scans the tape surface while the tape moves with a given speed. The scanning width is set to exclude the edge area of the tape. The scanning is effected on along the tape to correspond to a measurement area of 1 m². Further details are given below.

SSA Determination of the Tape Sample

The test is based on an optical inspection of the obtained extruded tape that is passed in front of an optical scanner able to scan even a large surface at high speed and with good resolution. The SSA-instrument is fully computerised and during the operation it automatically stores information about positions and sizes of pips found for statistical evaluation. "Pip" means herein a smaller burl with a height at least one order of magnitude higher than the surrounding background roughness. It is standing alone and the number per surface area is limited.

Height is the distance between the base line (=surface of the tape) and the highest point of a pip. Half height is defined as the width of the pip at 50% of its height (W50) measured from the baseline. For the half height measurement the surface of the tape sample is taken as the baseline. Pip is referred herein above and below as a "particle protruding from the surface of the tape". And thus the "half height of said particle protruding from the surface of the tape sample" as used herein in the description and claims is said half height width (W50). The instrument was SSA-analysing instrument of Semyre Photonic Systems AB, Sweden. Service company is Padax AB, Sweden. New supplier is OCS GmbH in Germany.

Hardware: PC via Image Pre Processor
Software: NOPINIT
Camera type: spectrophotograph camera from Dalsa with 2048 pixels, on-line camera with line frequency of 5000.
Light source: intensity regulated red LED,
The width resolution of the pip (particle): 10 µm,
The height resolution of the pip (particle): 1.5 µm.
Tape speed in SSA-instrument: 50 mm/s The horizon of tape surface is created of a rotating metal shaft. The light source and camera are directly aligned with no angel with a focal point on the horizon.

The scanning results are for 1 m² of tape and expressed as number of particles per m² having a width larger than 150 µm at a half height of said particle protruding from the tape surface (=baseline),
number of particles per m² having a width larger than 200 µm at a half height of said particle protruding from the tape surface (=baseline).

The given values represent an average number of particles obtained from 10 tape samples prepared and analysed for a semiconductive composition under determination.

It is believed that when using the above principles the SSA-method can be performed using another camera and set up-system provided the particle sizes given in description and claims can be detected and height at half width determined with corresponding accuracy, would result in the same results as the above reference SSA-method.

k) Volume Resistivity (VR)

The VR was measured according to ISO 3915 using the four-point method and tape samples consisting of the test polymer composition. The test tape was prepared herein as defined above under "Surface smoothness" test. The resistivity was measured using a conventional two electrode set-up, wherein the tape is arranged between the electrodes.

The volume resistivity was calculated as follows: Volume Resistivity (VR, ohm·cm)=R×B×D wherein,
R=resistivity, ohm,
B=breadth of tape, cm,
D=thickness of tape, cm,
L=distance between the two electrodes, cm.
In the method used herein the distance was L=2.54 cm
The present invention will be further illustrated by means of the following examples:

Example 1

Semiconductive Polymer Composition of the Invention.

61.4 wt % of conventional ethylene butyl acrylate (EBA) copolymer produced via radical polymerisation in a high pressure tubular reactor, and the copolymer having the following properties: $MFR_2$ of 18 g/10 min (ISO 1133, load 21.6, 190° C.), butyl acrylate (BA) comonomer content of 14 wt %, melt temperature of 110° C., density 924 kg/m³ (ASTM D792), was fed together with 0.4 wt % of commercially available antioxidant (4,4'-bis(1,1'-dimethylbenzyl) diphenylamine) to the first hopper of a Buss mixer, MDK/E 200, (commercially available from Buss with a reciprocating co-kneader). The polymer component was mixed under heating to a molten stage. The temperature profile in said mixer for this test was as follows measured from the molten polymer mixture: first section 104° C. second section 117° C., third section 159° C., fourth section 201° C. and fifth section 208° C. The carbon black (b) used for preparing the semiconductive composition of this example had the properties as shown in Table 1. The carbon black (CB1) (modified N550 grade, (Birla carbon)) was added in two stages. The first part of 27.5 wt % of the carbon black was fed to mixer before said second section of 117° C. and the rest, second part, of said carbon black 10.7 wt % before said third section of 159° C. The total content of added carbon black was 38.2 wt %. The total throughput of the mixer was 1200 kg/hrs and the screw speed of the mixer was set at 121 rpm. The molten polymer mixture obtained from the mixer was then transferred to a commercial extruder, available from Berstorff, which was operating as an integrated unit with said mixer to provide 150 bar pressure for filtering the molten polymer through a 150 µm mesh filter in a known manner. The operating temperature of said extruder was approximately 220° C. After the filtration the polymer was pressed thorough an extrusion plate forforming pellets thereof in conventional manner. After pelletisation the pellets are dried and some of about 4 kg pellets are taken out for tape sample preparation for the SSA-analysis as defined above under Determination Methods in order to determine the surface smoothness of the obtained material.

Comparative Example 1

Comparative Semiconductive Polymer Composition
The preparation for producing this composition was effected in the same way as described in Example 1 except that the type of carbon black (CB2) was modified as specified in Table 1.

Example 2

Semiconductive Polymer Composition of the Invention
The preparation for producing this composition was effected in the same way as described in Example 1 except that the type of carbon black (CB3) was modified as specified in Table 1.

Example 3

Semiconductive Polymer Composition of the Invention
The preparation for producing this composition was effected in the same way as described in Example 1 except that the type of carbon black (CB4) was modified as specified in Table 1. The carbon black was N550 grade, supplier: Orion carbon, former: Evonik.

Comparative Example 2

Comparative Semiconductive Polymer Composition
The preparation for producing this composition was effected in the same way as described in Example 3 except that the type of carbon black (CB5) was modified as specified in Table 1.

CB4 gives excellent dispersion level of carbon black which results in very good surface smoothness, and yet the volume resistivity value is the lowest. This is due to the appropriate pellet parameters and also the combination of low mass pellet strength (MPS) and large pellet size. On the other hand, CB5 gives no preferable (or the highest) level of surface protuberance for semiconductive applications. This is due to too high values of MPS and M5H.

At the same time the semiconductive polymer compositions of the present invention provide excellent surface smoothness according to the above SSA test. Example 1 and Example 3 provided compositions with excellent surface smoothness as the respective carbon blacks CB1 and CB4 met the specifications of the invention with respect to pellet crush resistance. CB 2 had an excessive mass pellet strength so that dispersion in the polymer resin were poor. As a result, a large number of particles with a size of >150 μm and >200 μm were detected in a tape sample according to the SSA test. The composition of Example 2 has a fair compromise between surface smoothness and volume resistivity. Due to a rather small average pellet size, the surface smoothness is not as high as with CB1 in Example 1.

A comparison between Example 3 and Comparative Example 2 shows that CB5 has excessively high pellet crush resistance (MPS and M5H) and thus the surface smoothness was poor due to a large number of particles with a size of >150 μm and >200 μm detected in a tape sample according to the SSA test.

The above examples show that a semiconductive polymer composition containing a specific, modified carbon black meeting the specifications of the invention regarding pellet crush resistance lead to a composition having a superior overall performance regarding surface smoothness, dispersibility of the carbon black in the polymer composition and electric resistance (volume resistivity) which is important in semiconductive applications, especially if the compositions are used for the production of a semiconductive layer of an electric power cable.

| | | | Unit | Example 1 CB1 | Example 2 CB3 | Example 3 CB4 | Comparative Example 1 CB2 | Comparative Example 2 CB5 |
|---|---|---|---|---|---|---|---|---|
| | CB properties | Type | — | N550 | N550 | N550 | N550 | N550 |
| | | STSA | m²/g | 41 | 40 | 38 | 42 | 39 |
| | | Iodone adsorption number | g/kg | 45 | 45 | 41 | 45 | 41 |
| | | DBP adsorption number | cm³/100g | 122 | 122 | 123 | 122 | 122 |
| CB pellet properties | | MPS | N | 156.91 | 137.29 | 78.45 | 284.39 | 313.81 |
| | Toughness of CB pellets | Individual pellet hardness | CSAV (average) | cN | 12.75 | 11.77 | 22.56 | 16.67 | 22.56 |
| | | | M5H (average for the 5 hardest pellets) | cN | 20.59 | 20.59 | 29.42 | N/A | 46.09 |
| | | CB Pellet size | mm | 0.76 | 0.55 | 1.2 | 0.81 | 0.78 |
| Compound Properties | Surface roughness | Pips > 150 μm | pcs/m² | 10 | 40 | 9 | 226 | 500 |
| | | Pips > 200 μm | pcs/m² | 2 | 6 | 1 | 10 | 70 |
| | | VR at room temp | Ohm-cm | 5 | 5 | 4 | 5 | N/A |
| | | CB Content | % | 38.2 | 38.2 | 38.2 | 38.2 | 38.2 |

The samples were found to give different dispersion level of carbon black in the compounds. CB1 (inventive sample) achieved the highest dispersion level of carbon black which results in the lowest surface protuberance. This is due to the improved pellet parameters as also reported in Table 1. CB2 (comparative sample) gave no preferable (or too high) level of surface protuberance for semiconductive applications due to too high value of mass pellet strength (MPS). CB3 (inventive sample) gave much better carbon black dispersion level than CB2. The surface smoothness level is acceptable but not as high as that of the composition of Example 1.

The invention claimed is:
1. A process for preparing a semiconductive polymer composition, comprising the steps of:
   i) introducing 30-90 wt % of a polymer component (a) and 0-8 wt % additives in a mixer device and mixing the polymer component and additives at elevated temperature such that a polymer melt is obtained;
   ii) adding 30-70 wt % of a carbon black (b) having a mass pellet strength (MPS) according to ASTM D1937-13 of from 50 to 180 N and further mixing of the polymer melt to obtain a semiconductive polymer mixture, wherein the carbon black (b) has an average pellet size according to ASTM D1511-12 of from 0.1 to 5 mm, an average value of individual pellet hardness for the 5 hardest pellets (M5H) according to ASTM D5230-13 of from 15 to 35 cN, an average value of individual pellet hardness (CSAV) according to ASTM D5230-13 of from 10 to 30 cN and an iodine adsorption number measured according to ASTM D1510-13, method A of from 38 to 48 g/kg; and iii) extruding and pelletising the obtained polymer mixture.

2. The process for preparing a semiconductive polymer composition according to claim 1, wherein the carbon black (b) has one or more of the following characteristics:

a BET surface area (STSA value), measured by nitrogen adsorption according to ASTM D 6556-10 of from 20 to 60 $m^2/g$;

a DBP oil absorption number measured according to ASTM D2414-13 of from 100 to 150 $cm^3/100$ g.

3. The process for preparing a semiconductive polymer composition according to claim 1, wherein the composition has a surface smoothness measured according to the surface smoothness analysis using a tape sample as described herein of not more than 200 particles/$m^2$ having a width of larger than 150 μm, and/or not more than 9 particles/$m^2$ having a width of larger than 200 μm.

4. The process for preparing a semiconductive polymer composition according to claim 1, wherein said carbon black (b) is furnace carbon black.

5. The process for preparing a semiconductive polymer composition according to claim 1, wherein said polymer component (a) comprises an alpha-olefin polymer.

6. The process for preparing a semiconductive polymer composition according to claim 1, wherein said polymer component (a) comprises a homopolymer of a $C_{2-12}$ alphaolefin or a copolymer of a $C_{2-8}$ alpha-olefin with one or more comonomers of an $C_{3-30}$ alpha-olefin.

7. The process for preparing a semiconductive polymer composition according to claim 1, wherein polymer component (a) is selected from a branched ethylene homo- or copolymer and a linear ethylene homo- or copolymer.

8. The process for preparing a semiconductive polymer composition according to claim 1, wherein said polymer component (a) comprises at least one polyunsaturated comonomer.

9. The process for preparing a semiconductive polymer composition according to claim 1, wherein said polymer component (a) comprises at least one polar comonomer.

10. The process for preparing a semiconductive polymer composition according to claim 9, wherein said polar comonomer is selected from the group consisting of: vinyl carboxylate esters, (meth)acrylates, olefinically unsaturated carboxylic acids, (meth)acrylic acid derivatives, and vinyl ethers.

11. The process for preparing a semiconductive polymer composition according to claim 9, wherein the content of polar comonomer in said polymer component(a) is from 0.5 to 35 wt %, based on the total amount of said polymer component (a).

12. The process for preparing a semiconductive polymer composition according to claim 1, wherein the composition has a $MFR_{21}$ of from 1.0 g/10 min to 15 g/10 min, measured according to ISO 1133 at 125° C. and a load of 21.6 kg.

13. The process for preparing a semiconductive polymer composition according to claim 9, wherein the composition is cross-linkable via radical reaction or via silane groups.

* * * * *